(12) United States Patent
Hayward

(10) Patent No.: US 7,567,243 B2
(45) Date of Patent: Jul. 28, 2009

(54) SYSTEM AND METHOD FOR LOW POWER HAPTIC FEEDBACK

(75) Inventor: Vincent Hayward, Montreal (CA)

(73) Assignee: Immersion Corporation, San Jose, CA (US)

( * ) Notice: Subject to any disclaimer, the term of this patent is extended or adjusted under 35 U.S.C. 154(b) by 752 days.

(21) Appl. No.: 10/858,216

(22) Filed: Jun. 1, 2004

(65) Prior Publication Data

US 2005/0012710 A1    Jan. 20, 2005

Related U.S. Application Data

(60) Provisional application No. 60/474,434, filed on May 30, 2003.

(51) Int. Cl.
*G09G 5/00* (2006.01)
*G06F 3/01* (2006.01)

(52) U.S. Cl. .................. 345/184; 345/156; 715/701; 715/702

(58) Field of Classification Search ............ 345/156, 345/157, 161, 163, 167, 168, 184; 715/700, 715/701, 702; 200/175, 11 TW, 6 B, 6 BB, 200/6 C, 19.2; 463/37, 38, 30; 700/17, 19, 700/83–85
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,050,265 A | 9/1977 | Drennen et al. | |
| 4,131,033 A | 12/1978 | Wright et al. | |
| 4,160,508 A | 7/1979 | Salsbury | |
| 4,236,325 A | 12/1980 | Hall et al. | |
| 4,262,240 A | 4/1981 | Arai | |
| 4,513,235 A | 4/1985 | Acklam et al. | |
| 4,553,080 A | 11/1985 | Cannon et al. | |
| 4,560,983 A | 12/1985 | Williams | |

(Continued)

FOREIGN PATENT DOCUMENTS

DE    3524439    1/1987

(Continued)

OTHER PUBLICATIONS

*The PowerBraille, Refreshable Braille Display User's Guide*; Blaizie Engineering; 1998.

(Continued)

*Primary Examiner*—Henry N Tran
(74) *Attorney, Agent, or Firm*—Womble Carlyle Sandridge & Rice, PLLLC

(57) ABSTRACT

Systems and methods for low power consumption haptic feedback are described. In one described system, a device comprises a manipulandum and a haptic effect generator in communication with the manipulandum. The actuator is operable to provide a first haptic profile associated with a first mechanical configuration and a second haptic profile associated with a second mechanical configuration. The device also comprises an actuator in communication with the haptic effect generator, which is operable to switch the haptic effect generator between the first haptic profile and the second haptic profile.

27 Claims, 7 Drawing Sheets

U.S. PATENT DOCUMENTS

| | | |
|---|---|---|
| 4,581,491 A | 4/1986 | Boothroyd |
| 4,599,070 A | 7/1986 | Hladky et al. |
| 4,652,805 A | 3/1987 | Kohn |
| 4,706,294 A | 11/1987 | Ouchida |
| 4,708,656 A | 11/1987 | De Vries et al. |
| 4,713,007 A | 12/1987 | Alban |
| 4,758,165 A | 7/1988 | Tieman et al. |
| 4,794,388 A | 12/1988 | Matthews |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,943,866 A | 7/1990 | Barker et al. |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,204,600 A | 4/1993 | Kahkoska |
| 5,212,473 A | 5/1993 | Louis |
| 5,220,260 A | 6/1993 | Schuler |
| 5,227,594 A | 7/1993 | Russo |
| 5,240,417 A | 8/1993 | Smithson et al. |
| 5,254,919 A | 10/1993 | Bridges et al. |
| 5,261,291 A | 11/1993 | Schoch et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,381,080 A | 1/1995 | Schnell et al. |
| 5,382,373 A | 1/1995 | Carlson et al. |
| 5,396,266 A | 3/1995 | Brimhall |
| 5,414,337 A | 5/1995 | Schuler |
| 5,466,213 A | 11/1995 | Hogan |
| 5,542,672 A | 8/1996 | Meredith |
| 5,547,382 A | 8/1996 | Yamasaki |
| 5,559,432 A | 9/1996 | Logue |
| 5,578,238 A | 11/1996 | Weiss et al. |
| 5,627,531 A | 5/1997 | Posso et al. |
| 5,665,946 A | 9/1997 | Nishijima et al. |
| 5,683,615 A | 11/1997 | Munoz |
| 5,691,898 A | 11/1997 | Rosenberg et al. |
| 5,705,085 A | 1/1998 | Munoz et al. |
| 5,730,655 A | 3/1998 | Meredith |
| 5,766,016 A | 6/1998 | Sinclair |
| 5,767,839 A | 6/1998 | Rosenberg |
| 5,781,172 A | 7/1998 | Engel et al. |
| 5,785,630 A | 7/1998 | Bobick et al. |
| 5,825,308 A | 10/1998 | Rosenberg |
| 5,889,670 A | 3/1999 | Schuler et al. |
| 5,914,705 A * | 6/1999 | Johnson et al. ............. 345/163 |
| 5,944,151 A | 8/1999 | Jakobs et al. |
| 6,002,184 A | 12/1999 | Delson et al. |
| 6,008,800 A | 12/1999 | Pryor |
| 6,020,875 A | 2/2000 | Moore et al. |
| 6,087,829 A | 7/2000 | Jager |
| 6,100,476 A | 8/2000 | Adamietz et al. |
| 6,111,577 A | 8/2000 | Zilles et al. |
| 6,147,422 A | 11/2000 | Delson et al. |
| 6,154,201 A * | 11/2000 | Levin et al. ................. 345/184 |
| 6,219,034 B1 | 4/2001 | Elbing et al. |
| 6,262,717 B1 | 7/2001 | Donohue et al. |
| 6,271,834 B1 | 8/2001 | May et al. |
| 6,283,859 B1 | 9/2001 | Carlson et al. |
| 6,307,285 B1 | 10/2001 | Delson et al. |
| 6,320,487 B1 * | 11/2001 | Miller et al. ................ 335/274 |
| 6,324,928 B1 | 12/2001 | Hughes |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,420,806 B2 | 7/2002 | Wittig |
| 6,422,941 B1 | 7/2002 | Thorner et al. |
| 6,437,771 B1 | 8/2002 | Rosenberg et al. |
| 6,468,158 B1 | 10/2002 | Ootori et al. |
| 6,480,752 B1 | 11/2002 | Blume et al. |
| 6,587,091 B2 * | 7/2003 | Serpa ......................... 345/156 |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 * | 9/2003 | Oster et al. ................. 200/564 |
| 6,636,197 B1 | 10/2003 | Goldenberg et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,876,891 B1 | 4/2005 | Schuler et al. |
| 6,965,370 B2 | 11/2005 | Gregorio et al. |
| 6,987,508 B2 * | 1/2006 | Numata et al. .............. 345/184 |
| 2001/0052893 A1 | 12/2001 | Jolly et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0128192 A1 | 7/2003 | van Os |
| 2003/0184518 A1 | 10/2003 | Numata et al. |

FOREIGN PATENT DOCUMENTS

| | | |
|---|---|---|
| EP | 0349086 | 1/1990 |
| EP | 0626634 | 11/1994 |
| EP | 0 789 321 A2 | 8/1997 |
| EP | 1 217 496 A2 | 6/2002 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Kim Nice; *How Washing Machines Work*; http://home.howstuffworks.com/washer.htm/printable; Aug. 20, 2003; pp. 12-16.

Allen Bernard; *Company Sees MEMS As Solution For Affordable Braille Displays*; Smalltimes, News about MEMS, Nanotechnology and Microsystems; http://www.smalltimes.com/print_doc.cfm?doc_id=3432; Apr. 9, 2002; pp. 1-3.

Annex to Form PCT/ISA/206, Communication Relating To the Results of the Partial International Search Report; Sep. 11, 2005; 2 pgs.

International Search Report; Jan. 17, 2006; 4 pgs.

Rosenberg, Louis B., "Virtual Fixtures": Perceptual Overlays Enhance Operator Performance in Telepresence Tasks, Dept. of Mechanical Engineering, Stanford University, Aug. 1994, pp. ii-214.

Snibbe, Scott S., "Haptic Techniques for Media Control," In Proceeding of the 14th Annual ACM Symposium on User Interface Software and Technology, 2001, pp. 1-10.

Adelstein, "A Virtual Environment For The Study of Human Arm Tremor," Ph.D. Dissertation, Dept. of Mechanical Engineering, MIT, Jun. 1989.

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings Of Fourth CISM-IFToMM, Sep. 8-12, 1981.
Bejczy, et al., "Universal Computer Control System (UCCS) For Space Telerobots," CH2413-3/87/0000/0318501.00 1987 IEEE, 1987.
Bejczy et al., "A Laboratory Breadboard System for Dual-Arm Teleoperation," SOAR '89 Workshop, JSC, Houston, TX, Jul. 25-27, 1989.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Caldwell et al., "Enhanced Tactile Feedback (Tele-Taction) Using a Multi-Functional Sensory System," 1050-4729/93, pp. 955-960, 1993.
"Cyberman Technical Specification," Logitech Cyberman SWIFT Supplement, Apr. 5, 1994.
Eberhardt et al., "OMAR—A Haptic Display for speech perception by deaf and deaf-blind individuals," IEEE Virtual Reality Annual International Symposium, Seattle, WA, Sep. 18-22, 1993.
Eberhardt et al., "Including Dynamic Haptic Perception by The Hand: System Description and Some Results," DSC-vol. 55-1, Dynamic Systems and Control: vol. 1, ASME 1994.
Gobel et al., "Tactile Feedback Applied to Computer Mice," International Journal of Human-Computer Interaction, vol. 7, No. 1, pp. 1-24, 1995.
Gotow et al., "Controlled Impedance Test Apparatus for Studying Human Interpretation of Kinesthetic Feedback," WA11-11:00, pp. 332-337.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bulletin, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Marcus, "Touch Feedback in Surgery," Proceedings of Virtual Reality and Medicine The Cutting Edge, Sep. 8-11, 1994.
McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Texture for a Force-Feedback Display," Ph.D. Dissertation, MIT, Jun. 1995.
Ouh-Young, "Force Display in Molecular Docking," Order No. 9034744, p. 1-369, 1990.
Ouh-Young, "A Low-Cost Force Feedback Joystick and Its Use in PC Video Games," IEEE Transactions on Consumer Electronics, vol. 41, No. 3, Aug. 1995.
Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Pimental et al., "Virtual Reality: through the new looking glass," $2^{nd}$ Edition; McGraw-Hill, ISBN 0-07-050167-X, pp. 41-202, 1994.
Rabinowitz et al., "Multidimensional tactile displays: Identification of vibratory intensity, frequency, and contactor area," Journal of The Acoustical Society of America, vol. 82, No. 4, Oct. 1987.
Russo, "The Design and Implementation of a Three Degree of Freedom Force Output Joystick," MIT Libraries Archives Aug. 14, 1990, pp. 1-131, May 1990.
Russo, "Controlling Dissipative Magnetic Particle Brakes in Force Reflective Devices," DSC-vol. 42, Advances in Robotics, pp. 63-70, ASME 1992.
Scannell, "Taking a Joystick Ride," Computer Currents, Boston Edition, vol. 9, No. 11, Nov. 1994.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSC-vol. 42, Advances in Robotics, pp. 55-61, ASME 1992.
Tadros, "Control System Design for a Three Degree of Freedom Virtual Environment Simulator Using Motor/Brake Pair Actuators", MIT Archive © Massachussetts Institute of Technology, pp. 1-88, Feb. 1990.
Terry et al., "Tactile Feedback In A Computer Mouse," Proceedings of Fourteenth Annual Northeast Bioengineering Conference, University of New Hampshire, Mar. 10-11, 1988.

* cited by examiner

SYSTEM AND METHOD FOR LOW POWER HAPTIC FEEDBACK

CROSS-REFERENCE TO RELATED APPLICATIONS

This patent application claims priority to U.S. Provisional Application Ser. No. 60/474,434, filed May 30, 2003, the entirety of which is hereby incorporated by reference.

FIELD OF THE INVENTION

The present invention generally relates to haptic feedback. The present invention more specifically relates to kinesthetic low power force feedback devices.

BACKGROUND

Many conventional buttons, sliders, dials, and other controls provide tactile or haptic feedback to the user. Feedback may be provided to the user by mechanical elements, such as detents, which are fabricated into the device. The feedback provided by devices relying primarily or solely on mechanical elements is rarely variable and, if variable, is not controllable in real time and hence is not programmable.

Some conventional controls comprise active or resistive (also referred to as passive) feedback, which is controllable in real time, see, e.g., U.S. Pat. No. 5,220,260. The addition of controllable haptic feedback to a device normally requires an actuator, and the actuator requires a power source. In devices designed for low power consumption, such as cell phones and other handheld devices, the power necessary to supply the actuator may be difficult to provide.

Thus, a need exists for systems and methods for providing controllable haptic feedback while minimizing power requirements.

SUMMARY

Embodiments of the present invention provide systems and methods for low power consumption haptic feedback. In one embodiment according to the present invention, a device comprises a manipulandum and a haptic effect generator in communication with the manipulandum. The haptic effect generator is operable to provide a first haptic profile associated with a first mechanical configuration and a second haptic profile associated with a second mechanical configuration. The device may also comprise an actuator in communication with the haptic effect generator and operable to switch the haptic effect generator between the first haptic profile and the second haptic profile.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1A:
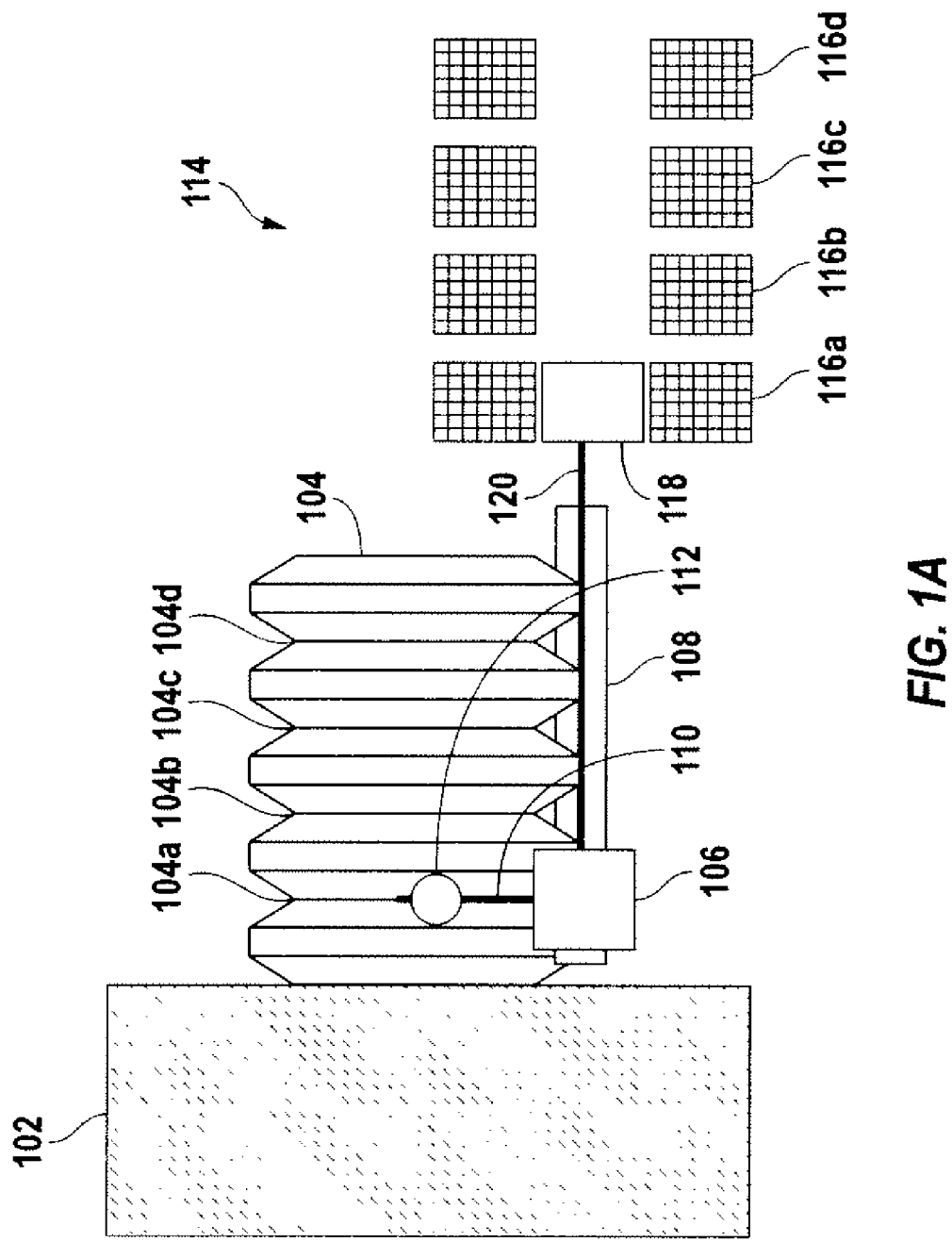
FIG. 1A is a schematic diagram illustrating a knob with programmable detent profiles in one embodiment of the present invention.
Figure 1B:
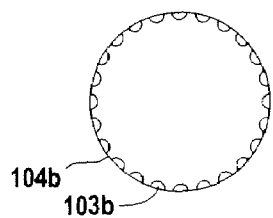
FIG. 1B is a sectional view showing a first channel having surface features configured to provided a first haptic profile.
Figure 1C:
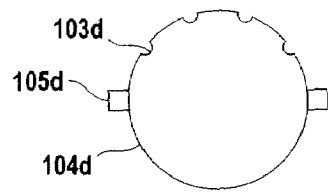
FIG. 1C is a sectional view showing a second channel having surface features including depressions and a stop, configured to provided a second haptic profile.

Embodiments of the present invention comprise systems and methods for low power haptic feedback. There are a variety of systems and methods according to the present invention.

One device according to the present invention comprises a manipulandum, a haptic effect generator, and an actuator. The device may be configured such that the haptic effect generator is in communication with the manipulandum. The manipulandum may be a knob, a slider, a push button, a joystick, or other manipulandum. The haptic effect generator may be operable to provide at least two haptic profiles—one associated with a first mechanical configuration and another associated with a second mechanical configuration. The two haptic profiles may be configured in any suitable manner. For example, they may be independent, or they may be combined in one or more files, data sets, records, or transmissions.

The actuator may comprise a solenoid, DC motor, shape memory alloy (SMA), or other suitable actuator. The actuator may be in communication with the haptic effect generator, and may be operable to switch the haptic effect generator between the first haptic profile and the second haptic profile.

The haptic effect generator may be configured in any suitable manner. For example, one haptic effect generator comprises a surface. The surface comprises two channels, which are substantially parallel to one another. Each channel comprises a plurality of surface features (e.g., depressions, protrusions, stops, etc.), which define a haptic profile. The haptic effect generator in such an embodiment also comprises a follower. A follower is an element configured to follow a surface or surface feature. IN one embodiment, the follower may be configured to follow a channel. In another embodiment, the follower may be configured to follow a path along a surface, or paths on multiple surfaces, that is not within a channel. For example, a follower may be configured to follow the surface of a cam.

An actuator in communication with the follower is operable to move the follower between the channels (or the two paths) and thereby change the haptic profile. The surface may comprise more than two channels.

In another embodiment, the haptic effect generator comprises a first surface comprising a first plurality of surface features and a second surface comprising a second plurality of surface features. The two surfaces are substantially parallel to one another and configured to move together. The haptic effect generator also comprises a follower to follow a surface, and an actuator to move the follower from the first surface to a second surface.

In one embodiment, the haptic effect generator may be configured to comprise a cylinder having a plurality of cams, and a lever operable to engage at least one of the plurality of cams. The plurality of cams may have the same or different mechanical configurations. The lever may comprise a spring-loaded lever, a spring-loaded pin, a pawl, and/or other suitable structure. As another example, the haptic effect generator may comprise a brake. A single-part shoe brake or other suitable brake may be used. A screw or other structure may be used to vary a friction exerted by the brake. A DC motor or other device may be used to turn or move the screw or other such structure.

As another example, the haptic effect generator may be configured such that it may be operable to alter a surface of the manipulandum. A pin or other structure may be positioned below the surface of the manipulandum. The haptic effect generator may comprise a slider operable to project the pin above the surface of the manipulandum.

One embodiment comprises device comprising a manipulandum, such as a button. The manipulandum comprises a surface, a portion of which defines a hole. The device also comprises a pin configured to move through the hole from a first position at or below the surface to a second position above the surface. An actuator in communication with the pin moves the pin from the first position to the second position.

Devices according to the present invention may also include other features. For example, a membrane or other structure may be placed proximate to the surface of the manipulandum such that it may prevent foreign matter from interfering with the operation of the haptic effect generator. As another example, a processor may be in communication with the actuator and be operable to affect a switch between the first of the at least two haptic profiles and the second of the at least two haptic profiles.

There are a variety of methods that may be carried out in accordance with the present invention. One method according to the present invention comprises generating an output signal operable to cause an actuator to switch a haptic effect generator from a first haptic effect to a second haptic effect. The haptic effect generator used in such a method may comprise a first mechanical configuration associated with the first haptic profile and a second mechanical configuration associated with the second haptic profile, or another configuration. A method according to the present invention may also comprise receiving an input signal associated with a haptic effect switch. The input signal may be associated with a device state or other data. In one embodiment of a method according to the present invention, the actuator comprises a DC motor. The output signal may comprise any suitable signal. For example, the output signal may comprise a positive pulse. The level of the pulse may be proportionally higher than a previous maximum. As another example, the output signal may comprise a negative pulse, proportional to the current level of friction, and a positive pulse of a magnitude proportional to the desired level of friction.

Embodiments of the present invention may also include a computer-readable medium encoded with code to carry out such methods. Any suitable code type may be used.

Below, systems and methods in accordance with the present invention are described with reference to FIGS. 1-8.

The present invention is not limited to the examples given, but the examples are given to illustrate types of embodiments of the present invention.

Examples with Reference to the Figures

Referring now to the drawings in which like numerals indicate like elements throughout the several figures, FIG. 1A is a schematic diagram illustrating a knob with programmable detent profiles in one embodiment of the present invention. Embodiments of the present invention provide systems and methods for providing haptic feedback to a user that minimizes the consumption of power. Haptic feedback provides tactile sensations that depend on movement, such as movement of a user's hand or of an actuator. In one embodiment of the present invention, the power for providing the haptic effect is provided by a user moving a manipulandum. The user experiences multiple haptic profiles that depend on multiple stable mechanical configurations or a low-power device.

In one embodiment of the present invention, haptic sensations depend on an external agent such as a computer, or more generally, a circuit that is aware of information external to the device. Hence such embodiments may be programmable. In other embodiments, a user utilizes a mode selector, which controls the haptic profile, or a manufacturer performs a mode selection before installing the device.

The embodiment shown in FIG. 1A comprises a knob 102. A user can rotate the knob 102 to perform some function, such as selecting a song from a play list on a digital music player. The knob 102 is connected to a haptic effect generator comprising a cylinder 104. A haptic effect generator is a device capable of generating a haptic effect, either directly or indirectly, on a manipulandum. The cylinder comprises four cams 104a-d having distinct mechanical (physical) profiles determining the haptic effect generated on the knob 102 and felt by the user manipulating the knob 102.

Figure 1D:
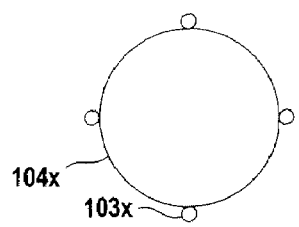
FIG. 1D is a sectional view showing a channel configured to provided a further haptic profile.
Figure 1E:
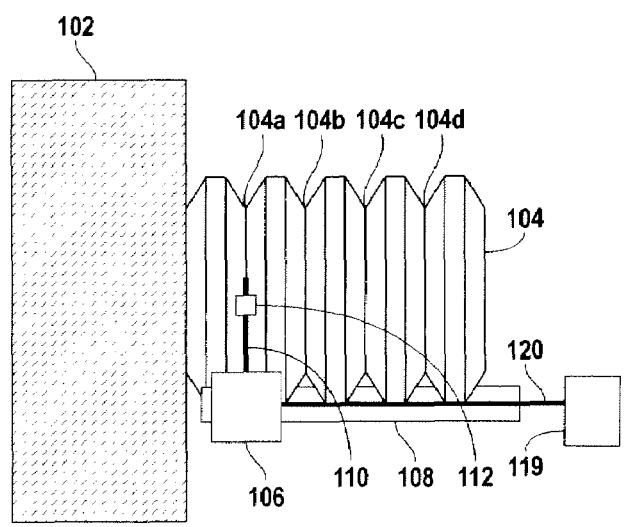
FIG. 1E is a schematic diagram illustrating a knob with programmable detent profiles in another embodiment of the present invention.

Each one of the four cams 104a-d provides a different haptic profile. A haptic profile comprises a pre-defined set comprising one or more haptic sensations, such as bumps, detents, stops, or other sensations. For example, in one embodiment, the first cam 104a is smooth and provides haptic feedback similar to a potentiometer. The second cam 104b (FIG. 1B) includes detents 103b that are shallow and closely spaced, providing haptic feedback similar to what is often provided by conventional audio volume controls. The third cam 104c includes a detent in the center of rotation and is otherwise smooth, providing haptic feedback similar to what is often provided by conventional tone, balance, or fader controls of an automotive audio system. The fourth cam 104d (FIG. 1C) includes four deep detents 104d spread evenly between two hard stops 105d, providing feedback similar to what is often provided for a fan control of an automotive climate control system. Another example of a cam including protrusions 103x is shown in FIG. 1D.

In the embodiment shown, a slider 106 on a square shaft 108 holds a lever comprising a leaf spring 110 terminated by a ball 112. The ball 112 presses on one of the cams 104a-d. The pressure of the ball 112 on the cam 104a-d provides the haptic effect. When the ball 112 is in a cam 104a-d, the mechanism provides a stable mechanical configuration. The mechanical configuration does not change until the actuator acts upon the haptic effect generator. In another embodiment, a spring-loaded pin is used instead of the lever.

In the embodiment shown in FIG. 1A, an actuator determines the position of the slider 106. The actuator comprises a solenoid 114 with four coils 116a-d and one iron core 118. The iron core 117 is connected to the slider 106 by a rod 120.

Activation of a coil 116a-d neighboring the present position of the core 118 changes the position of the slider 106, and consequently moves the ball 112 from a first cam 114a to a second cam 114b, and thereby changes the haptic feedback provided to the user. The coils 16a-d are connected to a power supply (not shown) and a switch (not shown). The switch may be a processor or may be connected to a processor.

Although FIG. 1A illustrates an embodiment for providing haptic effect profiles to a knob, a variety of similar devices could operate on this principle, including, for example, sliders, push buttons, and joysticks. In various embodiments, a mode selector, a processor, or some other control means may control the actuator. Similarly, the solenoids and plunger system used to switch between the haptic profiles is used for illustrative purposes only. In other embodiments of the present invention, any suitable mechanical system having a finite number of stable configurations coupled with one or more actuators able to displace the system into any of these stable configurations could be used according to the needs of particular applications. Various types of actuators may be utilized, including the exemplary actuators described herein.

One embodiment of the present invention comprises a processor in communication with the actuator and programmed to provide feedback based on parameters, such as user input and environmental factors, provided by sensors. Processors can comprise, for example, digital logical processors capable of processing input, execute algorithms, and generate output as necessary to control the actuator in response to input. Such controllers may comprise a microprocessor, an Application Specific Integrated Circuit (ASIC), and state machines. Such processors comprise, or may be in communication with, media, for example computer readable media, which stores instructions that, when executed by the processor, cause the processor to perform the steps described herein as carried out, or assisted, by a processor.

Embodiments of computer-readable media comprise, but are not limited to, an electronic, optical, magnetic, or other storage or transmission device capable of providing a processor, such as the processor in a web server, with computer-readable instructions. Other examples of suitable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, comprising a router, private or public network, or other transmission device or channel.

The embodiment shown in FIG. 1A utilizes a solenoid actuator. Another embodiments of the present invention shown in FIG. 1E includes a DC motor 119 as an actuator and uses a pin 113 (instead of a ball 112). In other embodiments, actuators incorporating shape memory alloy (SMA) fibers, such as NiTi fibers, provide actuation. Such actuators can be activated in single pulse mode using a simple pulse width modulated signal. Useable actuators are available from a variety of sources, including Nanomuscle, Inc. of Antioch, Calif. (www.nanomuscle.com). Other types of actuators may also be utilized, such as piezo or polymer actuators. In one embodiment, an actuator utilizing mechanical ratchets to displace the haptic effect generator into its multiple stable configurations, which are also referred to as rest positions, is used.

Figure 2:
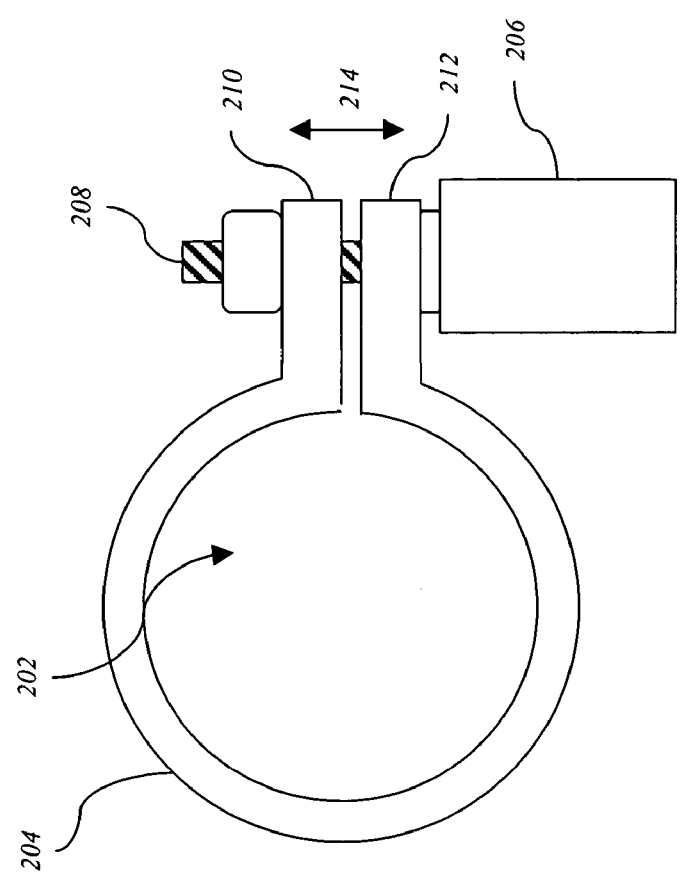
FIG. 2 is an schematic diagram of a resistive actuator with programmable friction in one embodiment of the present invention.

FIG. 2 is an illustration of a resistive actuator in one embodiment of the present invention. Conventional devices, such as electromagnetic powder brakes, with programmable friction consume power during nominal operation. In the embodiment shown in FIG. 2, a resistive actuator with programmable varying friction consumes power only when the friction is changed.

In the embodiment shown, a knob (not shown) is connected to a shaft (not shown). The shaft is positioned in the center 202 of a single part shoe brake 204 so that when the brake is applied, it resists rotation of the shaft. A motor 206, such as a DC motor, turns a screw 208 to actuate the brake 204. The brake has two ends 210, 212. When the motor 206 turns the screw 208, the two ends 210, 212 are pulled together or pushed apart along line 214. When the two ends 210, 212 are pulled together, the brake 202 tightens around the shaft (not shown) to provide a resistive force. When the two ends 210, 212 are pushed apart, the resistive force abates. The pitch of the screw 208 is such that when no power is applied to the motor 206, the friction exerted by the brake 204 remains approximately constant and stable.

The level of friction applied by the brake 204 is determined by the cycles of current applied to the motor 206. It can be precisely determined in open loop by taking advantage of the hysteretic properties of friction. The principle is to apply a different signal profile depending on whether friction has to be increased or decreased.

Applying pulses to the motor 206 achieves the controlling of the amount of friction applied to the manipulandum. The shape of the pulses is not important, only the magnitude of their extrema is. By convention, a positive pulse tightens the screw 208. To increase friction by a given amount, the level of the pulse must be proportionally higher than the previous maximum. To decrease friction, a negative pulse if first applied proportionally to the current level of friction (to reset), followed by a positive pulse of the desired magnitude. Because of the small masses and small movements involved, the time scale of these pulses can be of milliseconds. Other control methods may be utilized as well.

In the embodiment shown in FIG. 2, the amount of friction applied to a control remains constant between control pulses. For example, in one embodiment of the present invention, a knob is used to select the volume and frequency for a radio receiver. Control of the volume does not require a fine degree of accuracy. Selecting a frequency requires a finer grain of control to achieve the desired accuracy. When a user selects a function, such as the volume control mode, a pulse is sent to the actuator that results in low friction, i.e., the screw loosens or resets and then provides minimum friction. The user is able to quickly rotate the dial and make large changes in volume. However, the user is less able to make fine adjustments to the volume. When the user selects the frequency control mode, a pulse is sent to the actuator that causes a greater level of friction to be applied to the shaft of the knob. By applying friction, the brake slows the movement of the shaft down; such a control profile allows a user to more easily exercise precision in selecting a frequency.

Figure 3:
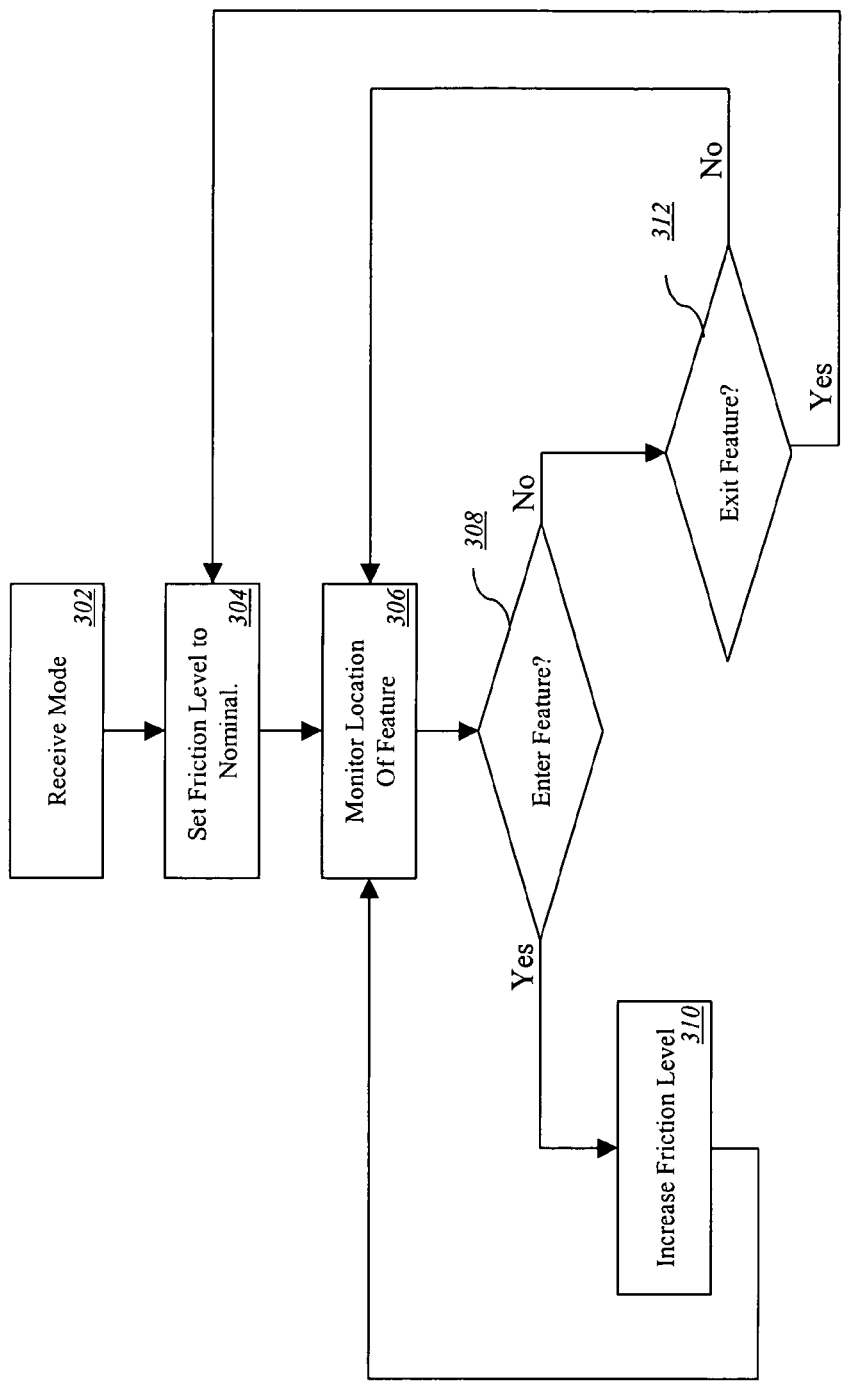
FIG. 3 is a flowchart illustrating a method for controlling the resistive actuator of FIG. 2 in one embodiment of the present invention.

FIG. 3 is a flowchart illustrating a method for controlling the actuator illustrated in FIG. 2 in one embodiment of the present invention. In the embodiment shown, a knob or other manipulandum provides a mechanism for scrolling through a list of names in an address book application or in a music play list of a digital music player. Each time the cursor encounters an item in the list, the actuator is controlled to cause a tactile pulse to be experienced by a user. In the embodiment shown, power is spent only to increase or decrease the applied friction.

When the user moves the knob such that the cursor encounters a feature, which is to be tactilely represented, such as a detent, step 308 detects the event corresponding to the cursor entering the feature. If this event is detected, then friction level is increased at step 310 by sending a pulse to the actuator 206. If the event of exiting the feature is detected at step 312, the friction is decreased at step 304 by resetting the device with a negative pulse sufficient to reduce the friction below the nominal level, and then by bringing the friction back to the nominal level with a positive pulse of the desired magnitude. The process continues while the user is utilizing the address book mode. In this manner, the user is able to quickly scroll through a long list of names and addresses and is also able to precisely place a cursor or other indicator on an individual entry in an address book list.

Figure 5:
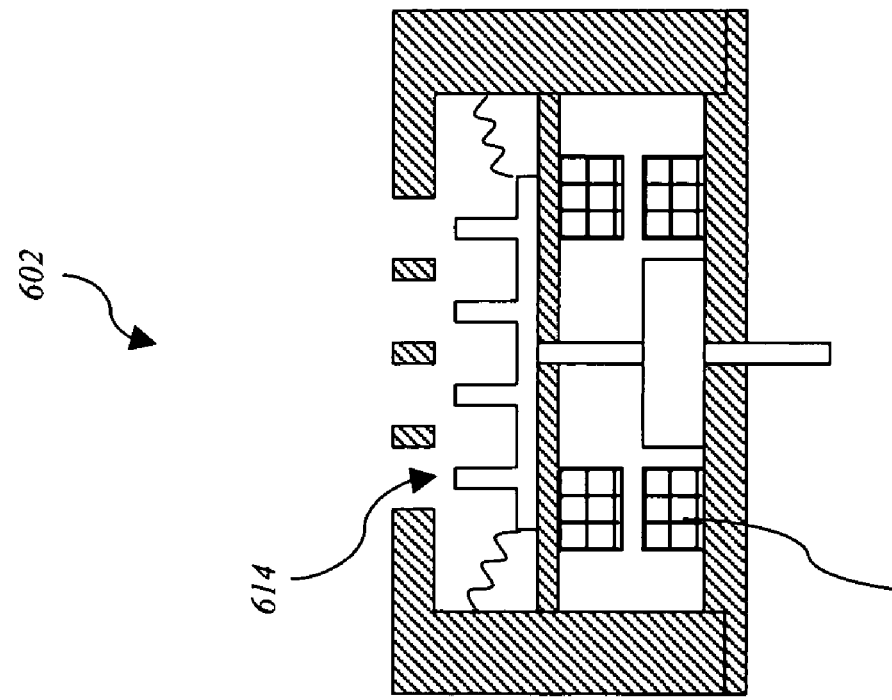
FIGS. 4 and 5 are schematic diagrams illustrating a programmable surface feel in one embodiment of the present invention.
Figure 4:
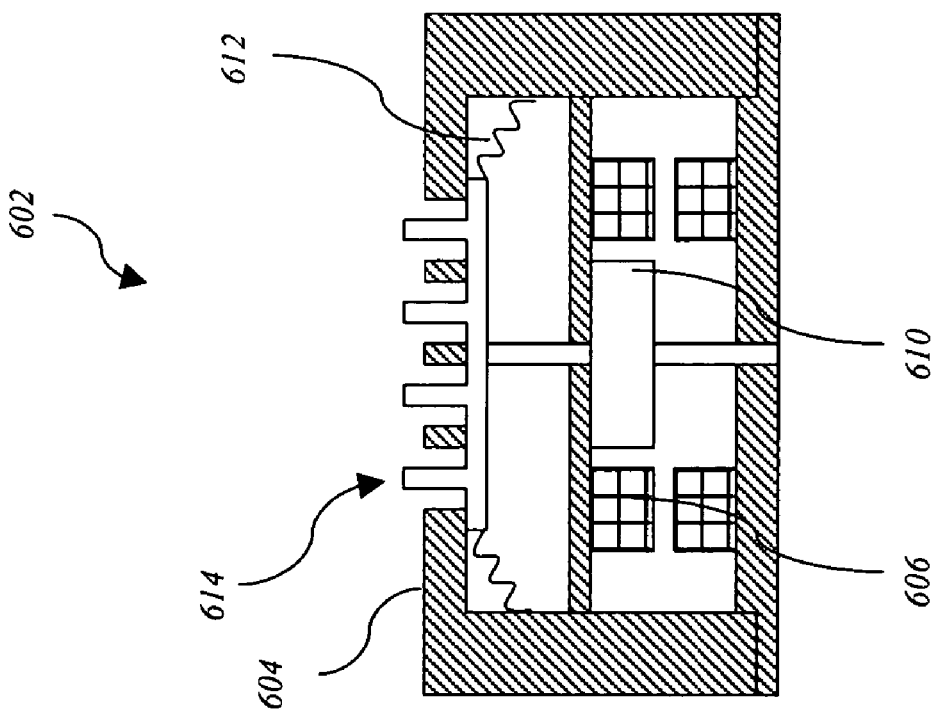

FIGS. 4 and 5 are schematic diagrams illustrating a programmable surface feel in one embodiment of the present invention. Such an embodiment is capable of providing programmable surface feel in various manipulanda, including, for example, to a push button or other device designed to engage contact with a user's skin during operation.

The button 602 comprises a surface 604. The surface 604 has an array of holes matching a plurality of teeth of an element 614 which can have two stable configurations, one in which the teeth are protruding as in FIG. 4 and the other in which the teeth are recessed as in FIG. 5. The switch from one configuration to the other is accomplished by activating one of the solenoid coils 606 or 608 acting in the iron core 610. An elastic membrane 612 is use to maintain the element 614 in one of the two stable configurations.

Figure 7:
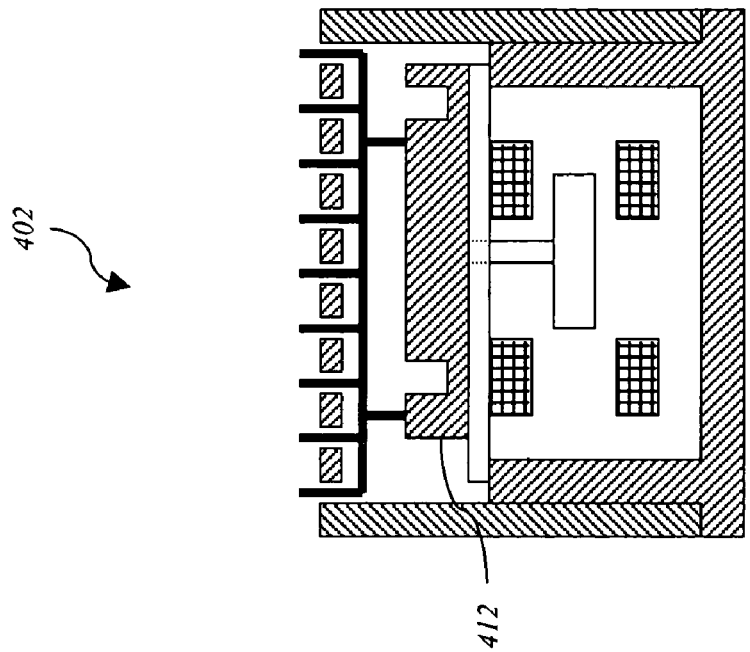
FIGS. 6 and 7 are schematic diagrams illustrating a programmable surface feel in another embodiment of the present invention.
Figure 6:
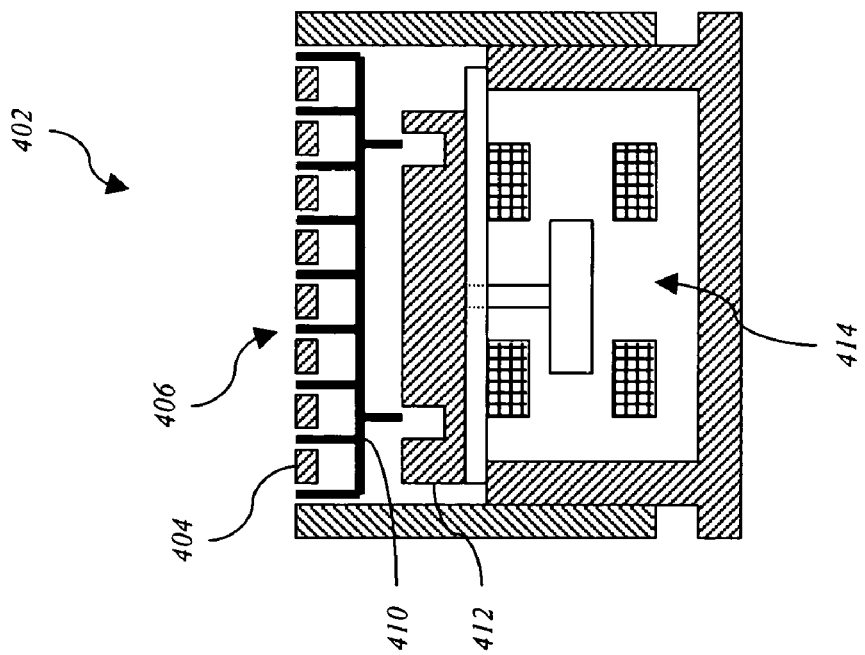

FIGS. 6 and 7 are schematic diagrams illustrating a programmable surface feel in another embodiment of the present invention. In the embodiment shown, a button 402 has a surface 404. The surface 404 of the button 402 has an array of holes, including hole 406. Located beneath the button surface 404 is an element 410 including a plurality of pins corresponding to the holes in the surface 404. A slider 412, which is activated by a solenoid 414, has two stable positions. The left position illustrated in FIG. 6 allows the array of pins to move freely with the surface of the button 402. The button surface 404 feels smooth when depressing the button 402. When the slider 412 is in the position illustrated by FIG. 7, the button surface 404 feels rough because the projects extend beyond the surface. In another embodiment, an actuator shifts the array of pins sideways with respect to the surface rather than indenting the skin. This can easily be accomplished by selectively engaging one or several cams as in the knob example above.

In one embodiment utilizing holes in the surface of a manipulandum, a membrane (not shown) is positioned above the pins. The membrane allows a user to feel the pins and prevents dirt, dust, or other foreign matter from entering the mechanism an interfering with movement of the pins.

Figure 8:
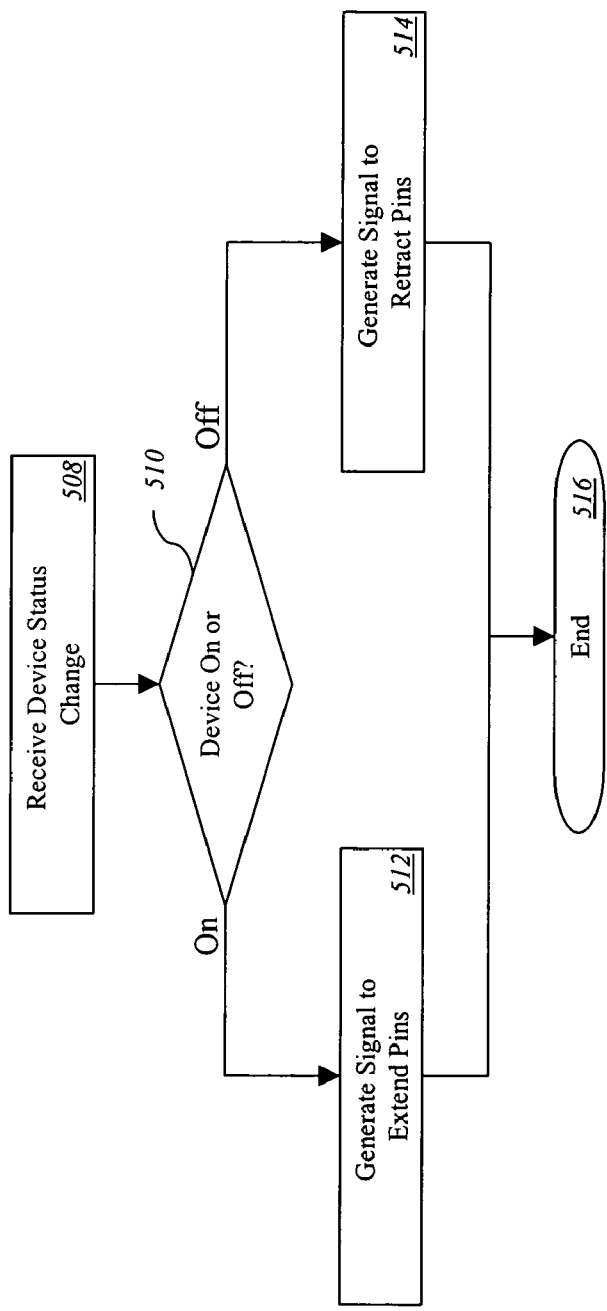
FIG. 8 is a flowchart illustrating a process for controlling the operation of an actuator, such as the actuator shown in FIGS. 6 and 7, in one embodiment of the present invention.

FIG. 8 is a flowchart illustrating a process for controlling the operation of the actuator shown in FIGS. 6 and 7 in one embodiment of the present invention. When a device changes state, this state is sent by a signal to the programmable button. For example, if a processor determines via a sensor signal that a device is turned off, the processor sends a signal to the actuator (414) to retract the pins (410). When the user places a finger on the membrane above the button (402) with the pins (410) retracted, the user can determine that the device is off without looking at the button or any other indicator.

When the user depresses the button (402), turning on the device, the processor receives a device status change signal indicating that the device is now on 508. The processor determines whether the device is now on or off by evaluating a data value associated with the signal 510. For example a value of "1" may indicate that the device is on; a value of "0" may indicate that the device is off. If the device is now off, the processor sends a signal to the actuator (414) to extend the pins (410) 512. If the device is now on, the processor sends a signal to the actuator (414) to retract the pins (410) 514. The process then ends 516. Again, solely by touching the button (402), the user is able to determine the state of whatever system or device the button (402) controls.

For example, in one embodiment, a button with an actuator according to the present invention controls the rear defroster of an automobile. Conventional buttons for controlling the rear defroster of an automobile often comprise an indicator light, which is illuminated when the defroster is on. With defrosters that turn themselves off after a time period, the user must look at the indicator light to determine whether or not the defroster is on. A button according to the present invention allows the user to determine whether or not the rear defroster is on simply by touching the control button. If the defroster is on, the pins are extended, and the user is able to feel the pins through the surface membrane of the switch.

The embodiment shown in FIGS. 4, 5, 6, and 7 is merely exemplary of how surfaces may be altered by embodiments of the present invention. Embodiments of the present invention may provide numerous other surface alterations as well.

An embodiment of the present invention may be advantageously implemented in applications where low power consumption is critical, such as in a remote control. In one embodiment of the present invention in a remote control, a knob allows the user to control multiple functions, such as volume, fast-forward/rewind (shuttle) and frame-by-frame picture (jog) control. When the user selects the volume control mode, the actuator engages a profile that allows the knob to move freely between to stops, a minimum and a maximum. When the user selects the jog control mode, the actuator engages a profile that allows the knob to move three hundred and sixty degrees through a series of equidistant detents.

One embodiment of the present invention comprises a toggle switch connected to a controllable profile element, which is further connected to an actuator. The toggle switch is able to move in one plane between two stops. In a first profile, the toggle switch is able to move throughout its range of motion with no detents. In a second profile, the toggle switch comprises a detent at or near one end of its range of motion and at or near the second end of its range of motion, operating like a conventional two-way light switch. In a third profile, the toggle switch comprises a third detent at approximately the mid-point of its range of motion. In one such embodiment, the mid-point comprises a neutral position.

Embodiments of the present invention may be pre-programmed. For example in one embodiment, a knob according to the present invention comprises three programmable profiles. The manufacturer of the knob delivers a shipment of these knobs to an automobile manufacturer. The automobile manufacturer uses the same type of knob to perform many different functions, requiring distinct profiles for each or between many of these distinct functions. The manufacturer is able to program the knob to provide a specific profile upon installation of the knob by applying power to the actuator. The knob retains this profile unless or until the profile is later changed. In the meantime, the device requires no power to impart the desired haptic effect.

Embodiments of the present invention may be used alone or in combination with other low-power haptic feedback devices, conventional mechanical devices, and active and passive/resistive haptic feedback devices. For example, a knob having various low-power detent effects may also be in communication with a vibratactile actuator, for example, an eccentric rotating mass (ERM) actuator, which imparts a vibration on the knob under certain conditions.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A device comprising:
a surface having a first channel comprising
a first plurality of surface features, the first plurality of surface features configured to provide a first haptic profile, and
a second channel substantially parallel to the first channel and comprising a second plurality of surface features, the second plurality of surface features configured to provide a second haptic profile;
a follower configured to follow the first channel and the second channel; and
an actuator in communication with the follower and operable to move the follower between the first channel and the second channel, wherein the actuator comprises a member formed of shape memory alloy.

2. The device of claim 1, wherein the surface comprises the surface of a cylinder.

3. The device of claim 2, wherein the first channel comprises a first cam and the second channel comprises a second cam.

4. The device of claim 1, wherein at least one of said first plurality of surface features comprises a protrusion.

5. The device of claim 1, wherein at least one of said first plurality of surface features comprises a stop.

6. The device of claim 1, wherein at least one of said first plurality of surface features comprises a depression.

7. The device of claim 1, wherein the follower comprises one of a pin, a pawl, and a lever.

8. The device of claim 1, wherein the actuator comprises one of a solenoid and a DC motor.

9. The device of claim 1, further comprising a manipulandum in communication with said surface.

10. The device of claim 9, wherein the manipulandum comprises one of a knob, a slider, a push button, and a joystick.

11. A device comprising:
a first surface comprising a first plurality of surface features, the first plurality of surface features configured to provide a first haptic profile, and
a second surface substantially parallel to the first channel and configured to move with the first surface, the second surface comprising a second plurality of surface features, the second plurality of surface features configured to provide a second haptic profile;
a follower configured to follow the first surface and the second surface; and
an actuator in communication with the follower and operable to move the follower between the first surface and the second surface, wherein the actuator comprises a member formed of shape memory alloy.

12. A device comprising:
a haptic effect generator operable to provide a first haptic profile associated with a first mechanical configuration and a second haptic profile associated with a second mechanical configuration; and
an actuator in communication with the haptic effect generator and operable to switch the haptic effect generator between the first haptic profile and the second haptic profile, wherein the actuator comprises a member formed of shape memory alloy.

13. The device of claim 12, further comprising a manipulandum in communication with the haptic effect generator.

14. The device of claim 13, wherein the manipulandum comprises one of a knob, a slider, a push button, and a joystick.

15. The device of claim 12, wherein the haptic effect generator comprises: a cylinder comprising at least two cams, each of the two cams having different mechanical configurations; and a lever operable to engage at least one of the at least two cams.

16. The device of claim 15 wherein the lever comprises a spring-loaded lever.

17. The device of claim 15, wherein the lever comprises a spring-loaded pin.

18. The device of claim 12, wherein the haptic effect generator comprises a brake.

19. The device of claim 18, wherein the brake comprises a single part shoe brake.

20. The device of claim 18, further comprising a screw operable to vary a friction exerted by the brake.

21. The device of claim 20, wherein the actuator comprises a DC motor operable to turn the screw.

22. The device of claim 12, wherein the haptic effect generator is operable to alter a surface of the manipulandum.

23. The device of claim 22, wherein the haptic effect generator comprises a pin positioned below the surface of the manipulandum.

24. The device of claim 23, wherein the haptic effect generator further comprises a slider operable to project the pin above the surface of the manipulandum.

25. The device of claim 23, wherein the actuator comprises a solenoid.

26. The device of claim 22, further comprising a membrane proximate to the surface of the manipulandum.

27. The device of claim 12, further comprising a processor in communication with the actuator and operable to affect a switch between the first of the at least two haptic profiles and the second of the at least two haptic profiles.

* * * * *